ENDLESS TAPE CARTRIDGE

Filed Sept. 15, 1965 2 Sheets-Sheet 1

INVENTOR.
HENRY E. ROYS
BY
Eugene M. Whitacre
Attorney

INVENTOR.
HENRY E. ROYS
BY Eugene M. Whitacre
Attorney

United States Patent Office 3,337,150

Patented Aug. 22, 1967

3,337,150

ENDLESS TAPE CARTRIDGE

Henry E. Roys, Indianapolis, Ind., assignor to Radio Corporation of America, a corporation of Delaware Filed Sept. 15, 1965, Ser. No. 487,484

5 Claims. (Cl. 242—55.19)

This invention relates to tape cartridges, and more particularly to tape cartridges adapted for use with an endless loop of magnetic tape.

In a tape cartridge containing an endless loop of magnetic tape spirally wound around the hub of a reel or turn-table, it has been found desirable to provide a certain amount of slack or looseness in the tape loop. This has the advantage of reducing the friction between adjacent convolutions in the tape roll, and thereby improve the wow and flutter characteristics of the cartridge during playback operation. Due to the slack in the tape loop, there are conditions which may occur such as when the cartridge is subjected to vibration or accidentally dropped, wherein the turns of tape adjacent to the innermost turn at the hub come loose, rise, and enter into a clearance area between the top of the hub and the upper part of the cartridge case. Under such conditions, it is virtually impossible to pull the inside tape turn free with the result that the tape may wrinkle causing jamming of the cartridge or breaking of the tape.

While some endless loop cartridges may contain an annular disc disposed around the hub and close to the top surface of the tape roll, present manufacturing costs prohibit hub and disc tolerances tight enough to insure that the clearance between the annular disc and the hub is small enough to prevent the innermost turns of tape near the hub from rising and coming free from the roll of the tape.

It is an object of the present invention to provide an improved magnetic tape cartridge.

Another object of the present invention is to provide an improved tape cartridge in which the innermost turns of tape adjacent the hub are prevented from rising from their normal position, but in which the innermost turn of tape is free to unwind from the hub during operation of the cartridge.

In accordance with the present invention, an endless loop tape cartridge includes a roll of magnetic tape spirally wound about the hub of a tape spool. An annular disc in the cartridge casing is positioned over the tape roll. A thin annular wafer is press fitted on the hub and seated on the top of the tape roll beneath the annular disc to constrain the turns of tape adjacent the innermost turn of tape on the hub within the body of the tape roll.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
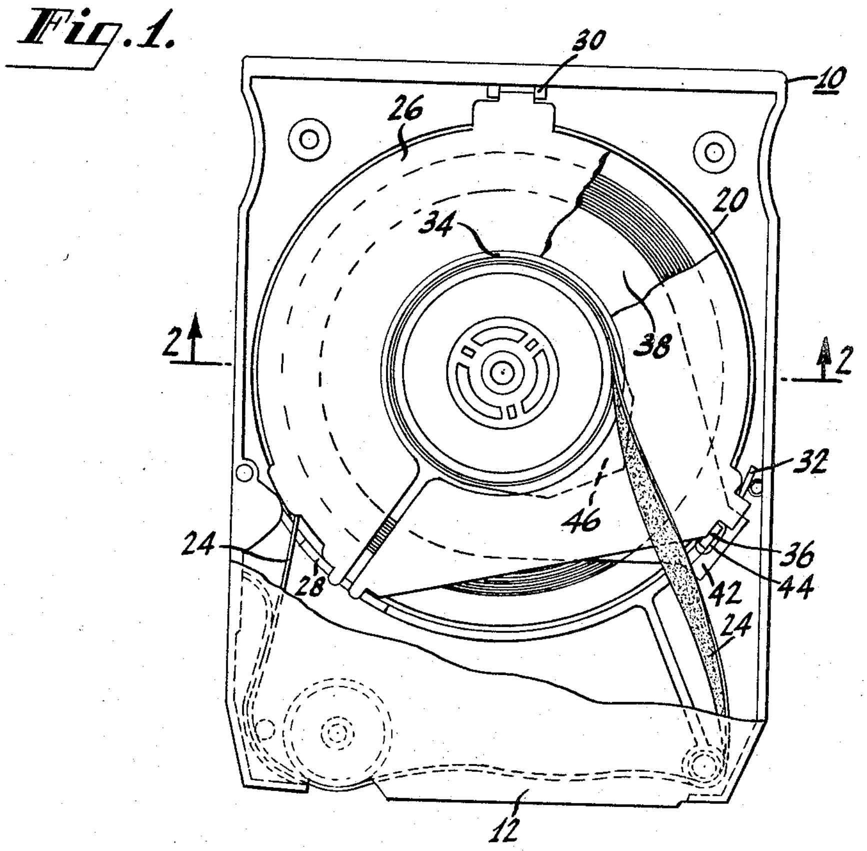
FIGURE 1 is a top plan view partially in section of an endless loop tape cartridge embodying the invention.
Figure 2:
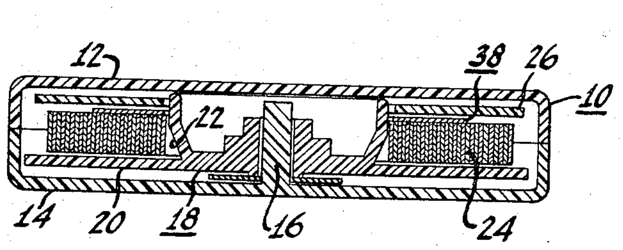
FIGURE 2 is a front sectional view of the cartridge taken on section line 2—2 of FIGURE 1.

Referring to the drawings wherein like reference numerals will be used to designate like parts in the various figures, and particularly to FIGURES 1 and 2, the tape cartridge includes a rectangularly shaped casing 10 having complementary top 12 and bottom 14 portions. An upright spindle 16 on the bottom portion 14 of the casing 10 serves as the bearing for a tape spool 18. The tape spool 18 includes a circular bottom plate 20 and an integrally formed tapered hub 22 about which a magnetic tape 24 is spirally wound. The spool 18 is rotatably mounted on the spindle 16.

An annular disc 26 is disposed about the top portion of the hub 22 and supported above the top edge of the spiralled tape 24 by means of notched studs 28, 30 and 32 projecting upwardly from the bottom portion 14 of the casing 10. The inside diameter of the disc 26 is slightly larger than that of the hub 22 to provide a clearance area 34 between the hub 22 and the inside perimeter of the disc 26 to permit the innermost convolution or turn of the tape roll to be brought out over the top face of the disc 26 toward the front of the cartridge as is known. As shown in FIGURE 1, the disc is eccentric in the area where the tape leaves the hub. The periphery of the spiral roll of tape is constrained on the plate 20 by means of a downwardly extending annular flange (not shown) on the underside of the top portion of the casing and by the studs 28, 30 and 32. A portion 36 of stud 32 also serves to receive and hold a portion of a wafer 38.

The remaining structural details of the cartridge may conform to those shown and described in my co-pending application Ser. No. 476,510, filed Aug. 2, 1965.

To prevent the turns of tape adjacent the innermost convolution of the tape roll from loosening and undesirably entering the clearance area 34 between the hub 22 and disc 26 and thereafter jamming the cartridge, it is necessary that the clearance area be less than the thickness of two turns or layers of tape and greater than the thickness of one such layer. If the disc is too close to the hub it may rub against the tape and/or hub and cause variations in the tape speed with a resulting increase in the wow and flutter characteristics of the cartridge. Since the average thickness of a layer of magnetic tape of the type generally used in an endless tape cartridge is in the order of one thousandth of an inch, it follows that the manufacturing tolerances required in the construction of a cartridge having the necessary hub and disc clearance have to be very tight. This would undesirably increase the manufacturing cost of the cartridge.

In accordance with the present invention a thin flexible washer-like wafer 38 made of a low friction surface material such as "Mylar" and having a central aperture 40 of a diameter slightly smaller than the largest diameter of the hub and substantially equal to the diameter of the hub at a level in line with the top edge of the tape roll is positioned over the hub and between the top edge of the tape roll and the underside of the disc 26.

Figures 4, 5:
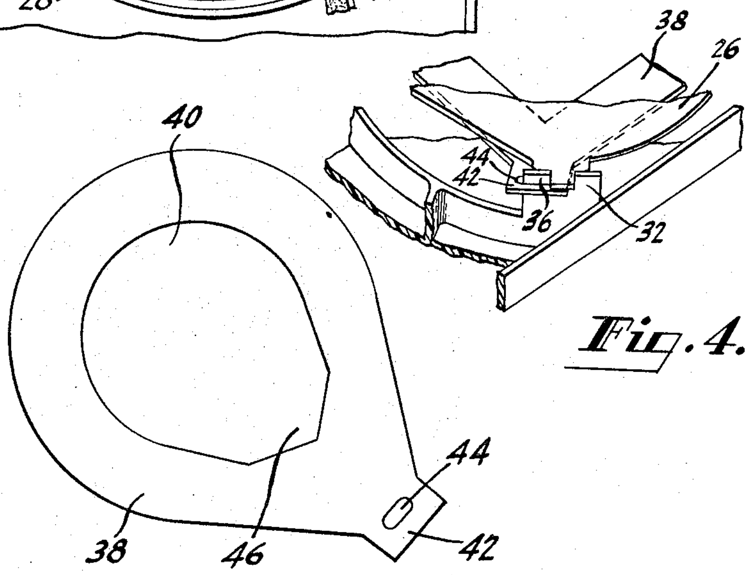
FIGURE 4 is a fragmentary perspective view partly in section of a portion of the cartridge showing the mounting of the wafer used in the cartridge.
FIGURE 5 is an enlarged top view of the wafer used in the cartridge shown in FIGURES 1, 2, 3 and 4.

As shown in FIGURE 5, the wafer 38 is generally circular in area and has a projecting tongue portion 42 on one side. The tongue portion 42 contains an opening 44 to receive the portion 36 of the stud 32 when the wafer 38 is positioned in the cartridge. The tongue 42 tends to hold the wafer 38 in place in the cartridge so as to prevent it from rotating with the hub during operation of the cartridge.

Figure 3:
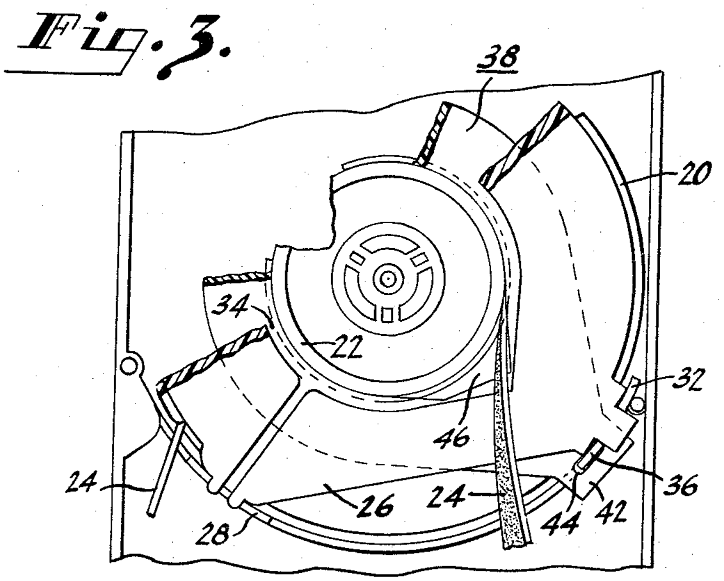
FIGURE 3 is a fragmentary view of the cartridge of FIGURE 1 showing the relative spacing and position of the wafer in the cartridge.

As shown in FIGURES 1 and 3, the wafer aperture 40 is eccentrically cut away 46 in the area adjacent the portion of the hub 22 where the innermost convolution of the tape roll is normally pulled up and away from the hub during operation of the cartridge.

In assembly of the cartridge, the wafer 38 is interference or force fitted over the hub 22 and seated on the top edge of the tape roll prior to the mounting of the annular disc 26. The interference fit of the wafer permits a relatively loose tolerance to be maintained in the fabrication of the wafer, while still achieving a closely surrounding fit of the wafer on the hub at a level adjacent the top edge of the spirally wound magnetic tape. With the wafer 38 tightly surrounding the hub 22, the clearance area 34 between the hub 22 and the inside perimeter of the disc 26 is effectively close to the convolutions of the tape roll adjacent the innermost convolution of tape surrounding the hub 22.

While it is preferable for the diameter of the wafer aperture 40 to be substantially equal to the diameter of the hub 22 at a level in line with the top edge of the tape roll, the exact dimensions of the wafer aperture are not critical. The eccentrically cut portion 46 of the aperture 40 as well as the use of a thin flexible low friction surface material for the wafer tends to reduce the tolerance requirement of the aperture 40. During operation of the cartridge, the eccentrically cut portion 46 of the aperture 40 permits the wafer 38 to flex and distort its shape so as to minimize its surface area contact with the hub and/or top edge of the tape roll while still providing a passage for the innermost convolution of the tape roll to unwind free from the hub. There is no effective increase in the wow and flutter characteristics of the cartridge.

It should be noted that the manufacturing cost of an endless loop tape cartridge embodying the wafer of the present invention is considerably less than the cost of such a cartridge manufactured without said wafer and with tight hub and disc tolerances.

What is claimed is:

1. In an endless loop tape cartridge of the type having a reel containing a roll of tape spirally wound about its hub portion, and a tape constraining disc disposed about said hub and spaced above the top edge of the tape roll, the improvement comprising:

an annular wafer surrounding the hub and above the top edge of the tape roll and beneath said constraining disc, said wafer having an inside diameter substantially equal to the diameter of the hub at its mounting position thereon.

2. In a tape cartridge of the type containing an endless loop of magnetic tape spirally wound around the tapered hub portion of a rotatable reel, and a tape constraining disc disposed about said hub and spaced above the top edge of the spirally wound magnetic tape, the improvement comprising:

a thin flexible annular wafer surrounding the hub and above the top edge of said spirally wound tape and beneath said constraining disc, the inside diameter of said wafer being slightly less than the largest diameter of said hub so as to provide a close fit with said hub at a level adjacent the top edge of said spirally wound magnetic tape.

3. In a tape cartridge of the type containing an endless loop of magnetic tape spirally wound around the tapered hub portion of a rotatable reel, and a tape constraining disc disposed about said hub and spaced above the top edge of the spirally wound magnetic tape, the improvement comprising:

a thin flexible annular wafer surrounding the hub and above the top edge of said spirally wound tape and beneath said constraining disc, the inside diameter of said wafer being slightly less than the largest diameter of said hub so as to provide a close fit with said hub at a level adjacent the top edge of said spirally wound magnetic tape, said wafer also having a projection extending outwardly from one side and secured to a portion of said cartridge to prevent said wafer from rotating with said hub during operation of said cartridge.

4. In an endless loop tape cartridge of the tape having a rotatable reel containing a roll of tape spirally wound about its hub portion and in which the innermost convolution of tape is drawn out from the hub during operation of the cartridge, and a tape constraining disc disposed about said hub and spaced above the top edge of the tape roll, the improvement comprising:

a thin flexible annular wafer surrounding the hub and above the edge of the spirally wound tape roll and beneath the constraining disc, said wafer having an inside diameter substantially equal to the diameter of the hub at its mounting position thereon, and an eccentrically cut away portion in the area where the tape is drawn from the hub, said wafer also having a projection extending outwardly from one side and secured to a portion of said cartridge to prevent said wafer from rotating with said hub during operation of said cartridge.

5. In a tape cartridge of the type including an endless loop of magnetic tape spirally wound around the tapered hub portion of a rotatable reel and in which the innermost convolution of said tape is adapted to unwind free from the hub during operation of the cartridge, and a tape constraining disc disposed about said hub and spaced above the top edge of the spirally wound magnetic tape, the improvement comprising:

a thin flexible annular wafer surrounding the hub and above the top edge of said spirally wound tape and beneath said constraining disc, the inside diameter of said wafer being slightly less than the largest diameter of said hub so as to provide a close fit with said hub at a level adjacent the top edge of said spirally wound magnetic tape, said wafer being eccentrically cut away in the area adjacent the hub where the innermost convolution of the tape unwinds from the hub during operation of said cartridge, said wafer also having a projection extending outwardly from one side and secured to a portion of said cartridge to prevent said wafer from rotating with said hub during operation of said cartridge.

References Cited

UNITED STATES PATENTS 2,778,635 1/1957 Eash ------------- 242—55.19
2,951,654 9/1960 Steelman ------- 242—55.19 X

FOREIGN PATENTS 1,002,123 8/1965 Great Britain.

FRANK J. COHEN, *Primary Examiner.*

B. S. TAYLOR, *Assistant Examiner.*